Oct. 16, 1962  R. FARENKOPF  3,059,178
HYGROMETER
Filed Aug. 5, 1959  2 Sheets-Sheet 1

Inventor:
Rudi Farenkopf
by Dicke, Craig and Freudenberg
Attorneys

Oct. 16, 1962 R. FARENKOPF 3,059,178
HYGROMETER
Filed Aug. 5, 1959 2 Sheets-Sheet 2
Fig. 8
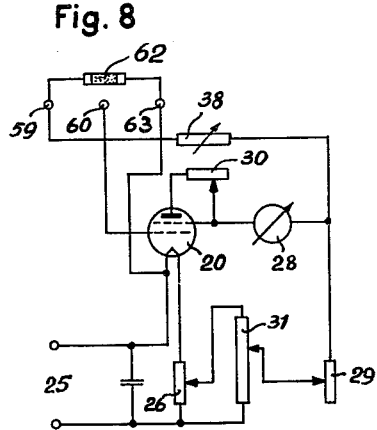
Fig. 9
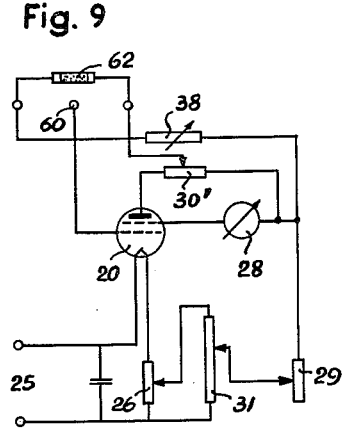
Fig. 10
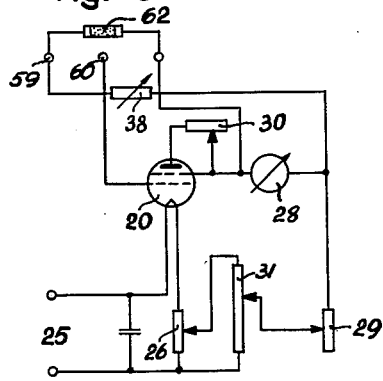
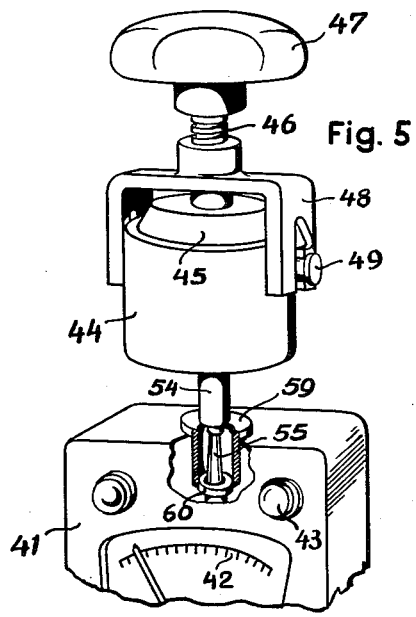
Fig. 5
Inventor
Rudi Farenkopf
by Dickes, Craig and Freudenberg
Attorneys

United States Patent Office 3,059,178
Patented Oct. 16, 1962

3,059,178
HYGROMETER
Rudi Farenkopf, Renningen, Wurttemberg, Germany, assignor to K. P. Mundinger G.m.b.H., Renningen, Wurttemberg, Germany
Filed Aug. 5, 1959, Ser. No. 831,895
21 Claims. (Cl. 324—65)

The present invention relates to an apparatus for measuring the moisture content of solid substances by electronic means comprising an electron tube, the anode circuit of which is provided with an ammeter and the grid potential of which is affected by the conductance of the substance to be measured which is placed between a pair of electrodes.

It is the principal object of the present invention to provide a hygrometer of the above-mentioned type which has a measuring range of such an extent that any moisture content which might occur in a variety of substances may be easily measured without requiring any special computations or adjustments or changes to be made in or on the apparatus between the different measurements.

It is a well-known fact that all organic materials, whether naturally grown or manufactured, retain a residue of moisture even though they appear to be dry. Insofar as such a moisture content is not caused by the nature of the substance itself, it may be absorbed from various sources including the surrounding air in accordance with the particular absorption capacity of the respective substance. Whatever such substance might be, it is in almost any case of great importance for its further treatment, storing or further use to determine its accurate moisture content.

One of the most conventional methods of determining the moisture content consists in measuring the electric resistance of the particular substance by measuring the current which corresponds to the electrical conductance of the substance. A conductance curve plotted by means of an ammeter in accordance with various moisture contents follows a certain exponential curve depending upon the particular characterteristics or properties of the respective substance. In order to attain the best possible linear indication it is therefore necessary to calibrate the instrument dial according to the logarithmic values of the measured currents. The known apparatus of this type only permit such measurements within a range of, for example, 8 to 22% of the moisture. This measuring range is, however, not sufficient for many purposes. The values below and above these limits, which apply to certain substances and are different for others, are condensed or suppressed by the kinds of circuit arrangements of the known hygrometers to such an extent that the changes in the pointer deflection are too small to be read.

This deficiency of the conventional hygrometers depends upon the characteristics of the conductance curves of the substances to be measured which, at a low moisture content, indicate extremely high resistance values which may even lie within the order of magnitude of the inner tube resistance of an electron tube, and they are therefore confined within a very narrow range on the scale of the ammeter. At a high moisture content near the so-called fiber saturation point, the resistance values are extremely small and, therefore, the resistance changes are also very small within this upper measuring range. When using an amplifier tube, the modulation or overload point thereof will therefore be surpassed.

As already indicated, the measuring ranges possible with the conventional apparatus are often not sufficient for determining the respective moisture content. Thus, for example, for a drying treatment or for an accurate adjustment of the apparatus for subjecting the substances to a subsequent treatment it may be necessary to apply a very specific amount of heat especially within the upper and lower ranges. Usually it is not sufficient merely to know that the moisture content lies below 8% or above 22%, but the moisture values, for example, between 3 to 8% and 22 to 28% may be of the greatest importance. Values below 3% usually result in resistance values which cannot be easily determined by a resistance measurement because of the almost complete dryness of the practically nonconductive substance and the insulating effect caused thereby. If the substance has, however, a moisture content above 30%, it may, insofar as the conventional apparatus are concerned, just as well be regarded as being fully saturated, regardless of how important an accurate determination of the actual content might be.

According to the present invention, it has been found that it is possible to vary the characteristic of an amplifier tube to such an extent that the upper and lower ranges of the scale, that is, those above and below the usual measuring range, may also be clearly and accurately read to determine the resistance values within these ranges. This may be attained according to the invention by omitting the conventional procedure of giving the tube a negative grid potential in order to utilize its normally most favorable operating range, and by connecting one measuring electrode directly to the grid, while applying the other electrode to the positive terminal of the anode current source which is also connected to the indicating instrument, usually an ammeter, which is connected to the anode of the tube. The measurement made is then one of the pure anode current which is preferably determined by the conductance of the respective substance between the two measuring electrodes. Since there is no negative grid potential, it is thus possible to measure and indicate particularly the lower resistance values within the operating range of the tube.

It is also possible according to the invention to apply a pentode, and to connect its screen grid to the ammeter and also via a variable resistor to the anode. Instead of a tube it is of course also possible to use a different kind of amplifier, for example, a magnetic amplifier or a transistor.

By omitting an initial loading of the measuring circuit as caused by the use of a resistor for producing the grid potential of a tube, it has also become possible to utilize and evaluate the entire range of modulation of the tube. The high resistance values which decrease considerably when the moisture content increases fall within the lower range of the characteristic of the vacuum tube which is otherwise cut off by the grid potential and in which only a small change occurs in the electron current emanating from the cathode. The anode current indicated by the ammeter will therefore also change only slightly but still to such an extent that it may be clearly measured and read. In this manner it is possible to carry out accurate measurements of the moisture values from 3 to 8%.

Although the relatively small changes in the lower resistance values at a high moisture content, for example, above 22%, fall within the upper range of the characteristic of the tube, these values still lie at least partly within the relatively steep range of the tube characerisic near the upper break thereof, since by the omission the negative grid potential, the total range has been shifted downwardly along the characteristic in the direction toward the lower currents. The high emission current of the tube therefore still allows a clearly readable change in the anode current even with a positive grid potential which is subjected to relatively small changes.

For attaining the inventive effects, it is of the greatest importance to provide special means for connecting one of the testing electrodes together with the conductor leading to the anode of the tube and containing the ammeter to the positive terminal of the anode current source. By such a particular connection it is possible within the range of high resistances, that is, at very low moisture contents, to calibrate the scale of the dial of the measuring instrument so as to be contracted in a particular manner which, however, still permits the indicated values to be clearly and accurately read. The particular means which will then permit the tube characteristic to be changed so that not only a very accurate but also a more linear measurement may be attained both in the lower and upper ranges of the characteristic will be later described herein.

The measuring circuit as above described is of the greatest advantage particularly when applied to portable hygrometers. Such apparatus should be of a light weight and a simple construction, and they should also be as versatile as possible in their application.

According to an earlier invention of mine, I provided only a small battery sufficient for heating the tube and also serving as a source for producing the anode potential by first converting the direct current of the battery into an alternating current by means of a vibrator or chopper and by then stepping up the alternating voltage by means of a transformer. However, I found that, since a device for producing the alternating anode potential by means of movable elements results in very considerable errors in indication unless additional means are provided to balance out these errors, it is not suitable for the purposes of the invention, namely, to attain a light portable apparatus.

According to the present invention, I have found that the most suitable current source for attaining accurate indications consists of a battery which not only provides the anode potential but also the heating potential by means of suitable resistors which are either specially selected or adjustable in accordance with the substances to be tested.

According to a further feature of the invention, it is of great advantage for attaining a suitable scale division of the ammeter if the required amplifier tube has a very high inner resistance and preferably consists of a screen-grid tube. Such a tube requires a low filament output and its anode potential also does not need to be very high. The battery required for providing the necessary anode potential of such a tube and also for heating the same will therefore last for a very long time.

Such a considerable simplification of the current supply means also reduces the manufacturing costs of a hygrometer according to the invention. Furthermore, because of its simple design, the apparatus is very accurate and reliable in operation, and many thousands of measuring tests may be carried out without requiring any replacement of the single battery.

As already indicated, it is essential according to the invention for attaining a proper division and readability of the scale of the dial of the instrument that, in combination with an electron tube with a high inner resistance, ohmic or other resistors are applied which are dependent upon the voltage, amperage, or temperature, or upon other physical values, and which serve to adapt the measuring instrument to different kinds of substances by adapting the tube characteristic to the different moisture conditions of the respective substances.

If an instrument of the conventional design is to be used for measuring the moisture content of, for example, wood, paper, leather, textiles, or cereals, the indicated values at lower moisture values of about 3 to 8% are, as stated in the beginning, contracted to such an extent that an accurate reading of the dial indication is virtually impossible. With a hygrometer according to the present invention, however, it is possible when calibrating the instrument by means of exchangeable or variable resistors to modify the characteristic of the electron tube to such an extent that a clearly readable scale will be attained for the respective moisture range of a certain substance to be measured, for example, from 3 to 15% or 4 to 28% or the like. It is for this purpose primarily necessary according to the invention to provide a compensating resistor for the heating circuit of the tube which is connected to a battery of a higher voltage than is required for heating the filament of the tube and which is variable for branching off the required voltage for the anode. According to a preferred embodiment of the invention, the adjustable tap of this filament resistor is connected in series with a potentiometer which is adjustable so as to stabilize the characteristic of the tube if any additional resistors within the measuring circuit have to be varied. In other words, a basic characteristic which is set up by means of other resistors lying within the measuring circuit is not changed if, at a certain adjustment of the potentiometer, the setting of the tap on the filament resistor is changed.

A further variable resistor is connected into the circuit of the ammeter and a third variable resistor in series with the anode. If the tube is one of the screen-grid type, this latter resistor may be connected between the anode and the terminal of the screen grid. By means of these three variable resistors it is possible in calibrating the instrument to adjust the same to the desired moisture range for which it is intended to be used and to extend the scale on the dial of the ammeter to indicate the values which are required for attaining accurate results within the boundary ranges of the tube characteristic.

The mentioned variable resistor in the measuring circuit in series with the ammeter is used for adjusting the maximum current value for the entire measuring range and for thus setting the current flowing through the measuring instrument to a fixed value at a full modulation of the tube. A further variable resistor for fixing a maximum value at which the instrument should still be readable is connected in series with the resistance of the substance to be tested which becomes effective at higher moisture contents. The boundary values of the tube characteristic will also be affected by the variable resistor which lies in series with the anode and permits a material variation of the characteristic. Another resistor lying parallel to the resistance of the substance to be measured, that is, between the electrodes, serves for setting up a standard value for checking the instrument at any time before a measurement is to be made.

Most measuring tests are carried out at a normal temperature of the substance corresponding to the calibration of the instrument and by means of simple electrodes which may be placed on, clamped on, inserted, or driven into the substance. If, however, the substance to be tested is a loose material, such as fruit seeds, grain, or other cereals, the testing electrodes should be in the form of a special testing vessel. The wall and cover of one of the vessels known for this purpose form one electrode, while an inserted insulated bottom forms or carries the other electrode. In order to attain accurate test results, the cover is designed so as strongly to compress the specimen to be tested. This results in an increase in the temperature of the substance which might result in a false indication. A similar effect may be attained if the substance to be tested was previously heated by a drying process or by grinding.

In order to overcome these deficiencies, the present invention further provides a measuring circuit which includes a temperature-responsive resistor so that the effect of the temperature of the substance may be very simply compensated without requiring any additional means. This arrangement is particularly valuable when the test is to be carried out in one of the mentioned test cups.

In order to avoid the necessity of a special mill for grinding cereals and similar materials to be tested by means of the new hygrometer, the invention further provides that the testing electrode which is inserted into the bottom of the testing vessel also serves as a grinding cone which permits the hard cellulose shells of the granular material to be ground off after it has been inserted into the vessel and the cover has been clamped thereon.

While in the previous methods the increase in temperature produced by the grinding operation was measured by a thermometer, this increase is taken into consideration according to the invention by inserting a temperature-responsive resistor in such a manner into the testing vessel or into the connecting terminal thereof that the resistor will, by heat conduction, be heated immediately to the same temperature as the material to be measured. This may be carried out in the most simple manner by positively connecting at least one end of the body of a composition resistor, to the testing vessel so that such resistor will be in direct heat conduction with the vessel and will thus assume the same temperature as the vessel which, in turn, has the same temperature as the material to be tested because of the intimate connection between the latter and the body of the vessel.

The temperature-responsive resistor may be connected as a compensating element in different manners into the measuring circuit. Thus, for example, while one end of the resistor extends into the metallic testing vessel, its other end is secured to a contact terminal which is mounted within the insulating bottom of the vessel and connected to the cathode of the amplifier tube, the grid of which is connected to the conical grinding electrode. However, the temperature-responsive resistance may also be connected to the slidable tap of a variable resistor which lies in parallel connection to the indicating instrument. Still another modification may consist in connecting the temperature-responsive resistor to the screen grid of the amplifier tube to which also the indicating instrument is connected.

If the indicating instrument is applied in the form of a double-coil instrument, the temperature-responsive resistor may be connected to the control coil and thus be galvanically separated from the remaining measuring circuit. However, the control coil of a double-coil instrument, which is connected to the terminal of the temperature-responsive resistor may also be connected to the measuring coil or through the latter to the screen grid or the cathode of the tube.

These and other objects, features, and advantages of the present invention will become further apparent from the following detailed description thereof, particularly when read with reference to the accompanying drawings, in which—

FIGURE 5 shows a perspective view of a part of the hygrometer according to the invention with a cup electrode mounted thereon;

FIGURE 6 shows the lower part of the cup electrode connected to a measuring circuit which is provided with temperature-compensating means;

FIGURE 7 shows a detail view in cross section of the conical grinding electrode according to FIGURE 6; while FIGURES 8, 9, and 10 show modifications of the temperature-compensating circuit which may be applied according to the invention.

Figure 1:
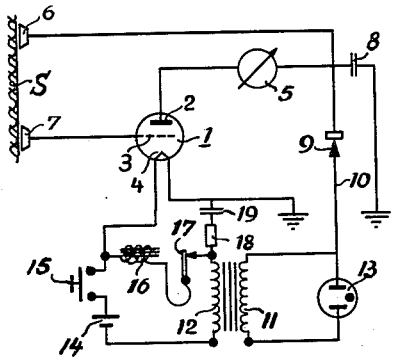
FIGURE 1 shows the circuit of a hygrometer with an amplifier tube and a source of alternating current according to a prior invention of mine.

Referring to the drawings, the measuring circut as illustrated in FIGURE 1 is designed according to an earlier invention of mine and contains an electron tube 1 which has an anode 2, a grid 3, and a cathode 4, and is connected to an indicating instrument 5 and to a pair of testing electrodes 6 and 7 between which the substance S to be tested is placed so as to permit the moisture content of this substance, which may vary within a wide range, to be accurately read within such entire range. The electrodes 6 and 7 are indicated as being of the type which are merely applied by surface contact against the substance S to be measured; they may, however, also be in the form of blades, spikes, probes, or cups or similar vessels in order to attain the most intimate contact with the substance.

The measuring circuit further contains a condenser 8 for steadying the pulsating current in order to avoid a fluctuating indication of the measuring instrument 5. This instrument is connected through a rectifier 9 to a line 10 leading to a secondary winding 11 of a transformer 11, 12, the voltage of which is kept constant by a glow discharge tube 13. The interconnected ends of the two transformer windings 11 and 12 are connected to the negative terminal of a small battery 14 of, for example, 4.5 volts. The positive terminal of battery 14 is connected through a pushbutton switch 15 to a coil 16 of a magnetic interrupter 17 and to the filament of cathode 4. When the pushbutton of switch 15 is depressed, interrupter 17 is operated and produces in primary winding 12 of the transformer an alternating current, the voltage of which serves as the anode potential. A leakage resistor 18 and a condenser 19 together serve as a spark suppressor for the interrupter contacts.

The characteristic of tube 1 is determined solely by its inner resistance and the size of the anode potential. The course of the anode current, which flows when the pushbutton of switch 15 is depressed and electrodes 6 and 7 are in engagement with the substance S to be tested, is then determined by the conductance of the substance at the prevailing moisture content thereof and is indicated by the instrument 5. If the measuring resistance is high, which at a low moisture content corresponds to a small conductance value, the anode current in tube 1 will be small. The pointer of instrument 5 will then deflect within the lower part of the dial scale. This is due to the fact that, because of the positive electrode potential, a high resistance on the grid will result in a corresponding peak inverse anode voltage which opposes the ionization of the tube. The grid current is therefore small. At a low moisture content of the substance S, however, the current flowing through the latter and reducing the grid potential can only increase gradually so that the indications of lower moisture contents of, for example, 3 to 8% will be confined between narrow limits, even though the conventional load resistance for producing a biasing grid voltage is omitted. At a high moisture content of the substance S and the resuling higher conductance thereof, grid 3 will receive a higher positive potential and the indications will again be condensed between narrow limits within the upper range of the instrument dial, although they will still be readable.

Such condensation or contraction of the upper and lower boundary values within very small scale limits prevents them from being accurately read and is therefore entirely unsatisfactory in actual practice particularly since these upper and lower values are often much more important and critical than the intermediate values which may be clearly read.

Figure 2:
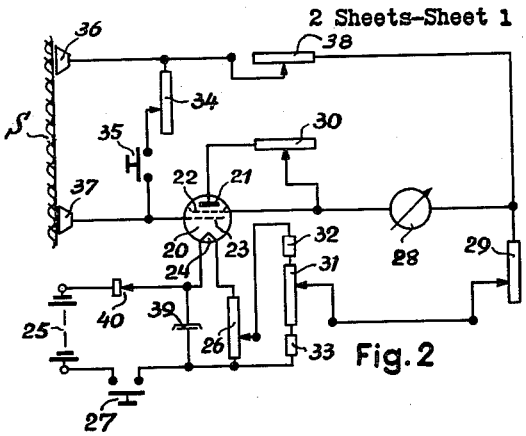
FIGURE 2 shows a measuring circuit with variable resistors according to my present invention.

These disadvantages are eliminated according to the present invention. The measuring circuit as illustrated in FIGURE 2 is for this purpose provided with an amplifying device such as a screen grid tube 20 with an anode 21, a screen grid 22, a grid 23, and a cathode 24. Because of the position of screen grid 22 in front of anode 21, tube 20 has a high inner resistance and therefore requires a low heat output. In place of an alternating current source including a special battery, an interruptor and a transformer as shown in FIGURE 1, the circuit according to FIGURE 2 is provided with a direct current source such as an anode battery 25 which also supplies the filament voltage through a variable resistor 26. For carrying out a measurement, a pushbutton or toggle switch 27 is operated to close the filament and anode circuits. The filament resistor 26 has an adjustable tap for varying the anode potential and reducing the current in the tube to the lowest possible value. By such a variation of the anode potential it is possible either to extend or contract the lower measuring range on the scale of a galvanometric measuring instrument 28.

The size of the anode current is adjustable by means of a variable resistor 29 which is connected in series with instrument 28 and limits the maximum deflection thereof. A further variable resistor 30 between the anode 21 and the screen grid 22 of tube 20 is provided for controlling the tube characteristic in such a manner that the total range of the instrument and the anode potential which corresponds to the maximum measuring current remain unchanged, while the maximum value of the indication will be shifted in the upward direction of the scale so that a more expanded indication will be attained within the higher range of the instrument scale.

The tap of resistor 29 is connected to a potentiometer 31 which includes a pair of limiting resistors 32 and 33 which merely prevent an overloading of the tube during the adjustment of potentiometer 31. By means of potentiometer 31 it is possible to adjust the current for operating the tube so as to remain the same independently of the adjustment of the other resistors so that the basic characteristic of the tube adjusted by means of the other resistors will also remain the same. Thus, the anode potential is adjustable directly by means of the filament resistor 26.

By further providing a calibrating resistor 34 which may be connected into the circuit by a switch 35 so as to bridge the electrodes 36 and 37, it is possible to adjust the instrument 28 to a certain standard value.

A further variable resistor 38 in series with electrodes 36 and 37 may be adjusted to effect an expansion of the measured values when the resistance to be measured is low and indicated within the upper range of the dial scale. The same effect is also produced by the connection of instrument 28 to screen grid 22 since the influence of the grid current will thereby be materially reduced relative to the anode current. The tube characteristic and, accordingly, the scale characteristic may thus be flattened considerably by means of resistors 30 and 38.

Figure 3:
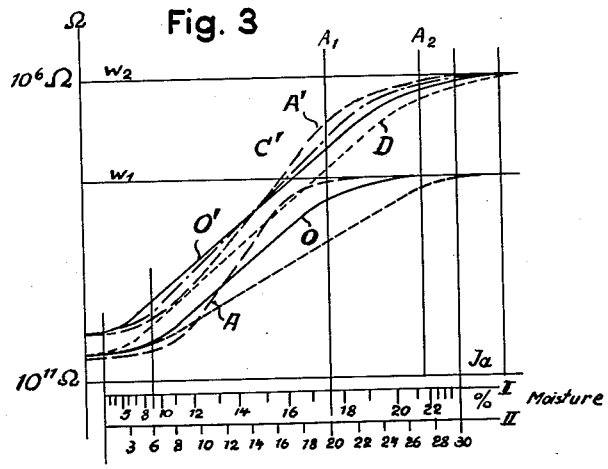
FIGURE 3 illustrates the variation of the tube characteristics attained by an adjustment of the variable resistors according to the invention.

The important operations for attaining a favorable expansion of the scale divisions or graduations therefore consists in the adjustment of resistors 26, 29, 30, 31, and 38. The influence of these resistors upon the tube characteristic is indicated in FIGURE 3 and upon the instrument scale in FIGURE 4. The fully drawn lines O and O' in FIGURE 3 are the characteristics of triodes at a low and high resistance of filament resistor 26 and a corresponding high and low anode potential, respectively. By changing the resistance of potentiometer 31 and by tapping a high resistance on resistor 26, it is possible to modify the lower characteristic so as to extend along a curve D between the two characteristics O and O'.

Figure 4:
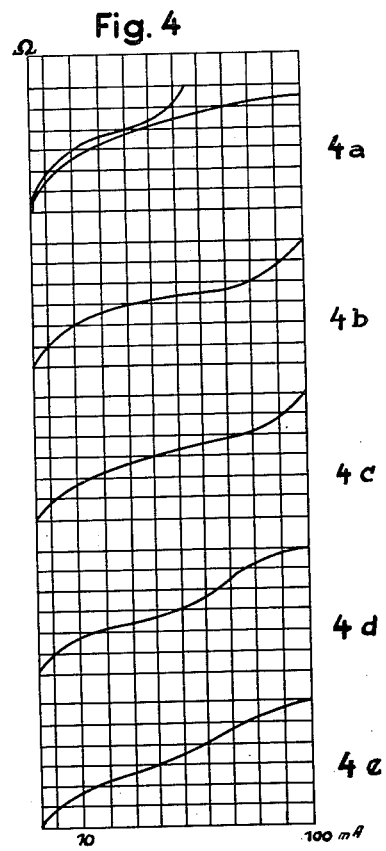
FIGURE 4 illustrates the variations of the indicating characteristic when one of the variable resistors is adjusted.

Part 4a of FIGURE 4 indicates the influence which the resistors 26 and 31 exert upon the measured resistance values indicated by the ammeter 28. A linear scale division, for example, from 1 to 100 milliamperes, is plotted on the abscissas, while the resistance values as they may occur in actual practice are plotted on the ordinates. The lower anode potential attained if a small resistance is tapped on filament resistor 29 results in a steep curve which terminates at a point approximately at the middle of the entire scale. This curve may be extended by tapping a higher voltage on resistor 26. However, the curve is then flattened to such an extent that the higher moisture contents cannot be properly measured. For attaining proper measuring curves which correspond to the intended measuring range for certain materials and permit the entire length of the instrument scale to be fully utilized, it is necessary also to adjust the other resistors.

The resistance values to be measured on the substance S between electrodes 36 and 37 lie within a range extending from $10^6$ to $10^{11}$ ohms. This entire range should fall within the range of modulation of the tube, and for this purpose the grid current should be changeable so as to produce a change of the anode current as proportionally thereto as possible. This would therefore require that a lower resistance value $W_1$ or $W_2$ will be coordinated with a maximum anode current $A_1$ or $A_2$, as indicated in FIGURE 3. The tube may then be given the characteristics O or A, or O' or A', respectively, depending upon the required accuracy of the boundary values. The maximum current value corresponding to these characteristics and to the moisture contents to be expected in adjusted on resistor 29 by means of a special calibrating resistor 33, the resistance of which is disposed in the characteristic near the boundary value $A_1$ or $A_2$, respectively. After resistor 29 has been properly adjusted, the resistance value measured then extends approximately as indicated at 4b in FIGURE 4. However, the lower and upper marginal values of the characteristic are then still relatively compressed.

A more favorable result may be attained by means of a screen grid tube, the characteristic C of which for the higher anode potential has been indicated in FIGURE 3 in dot-and-dash lines. By changing the resistance of the anode resistor 30 it is possible to flatten the characteristic and therefore also the measured resistance curve within the lower and upper marginal ranges to such an extent that the anode current values may be easily and accurately read. As indicated at 4c of FIGURE 4, this may, however, not always be sufficient since at high moisture contents the conductance values become too large. Furthermore, it is desirable for higher values to extend the dial scale from the end value $A_2$ to a value C. Scale I in FIGURE 3 is readable, for example, only up to an end value of 22% of moisture which may be sufficient, for example, for textiles. However, the instrument should also be calibrated for other materials which have an entirely different moisture content. Thus, for example, for wood it should be possible to measure a moisture content up to 30%.

In order to be able to read the measured resistance values with sufficient accuracy within the last third of the curve, resistor 38 is connected in series with the substance S. Its influence upon the last third of the curve may be seen at 4d in FIGURE 4. The high conductivity of the substance S is reduced by this resistor 38 to such an extent that the measured current will be gradually changed within the marginal region. If resistors 30 and 38 are then once more adjusted, it is possible to attain the almost straight curve as illustrated at 4e in FIGURE 4 which corresponds to scale II in FIGURE 3. In some instances it may be necessary to correct the adjustment of the resistors once more before the measured values may be uniformly read along the entire scale. The final adjustment of the resistors after once being completed is preferably locked in order to prevent any unintentional changes. The instrument may then be used for the particular substance S for which it has been calibrated. Insofar as the assembly of the instruments in their course of manufacture is concerned, such assembly is carried out identically in every case without regard of any subsequent use of the individual instrument. Obviously, this facilitates the manufacture considerably and reduces the cost of the instrument.

Finally, as shown in FIGURE 2, a condenser 39 is provided for stabilizing the battery 25 and also for preventing any changes in the inner resistance of the battery, while a diode 40 protects the measuring circuit and particularly tube 20 in the event that it is erroneously connected to the wrong terminals of the battery.

Figures 6, 7:
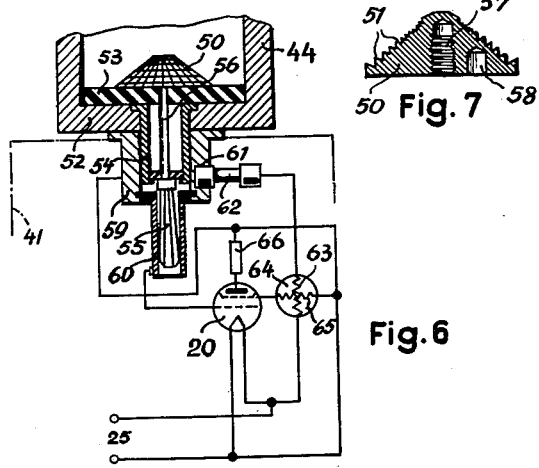

A preferred embodiment of the upper part of a hygrometer according to the invention is illustrated in FIGURE 5. It consists of a housing 41, a dial with a scale 42 thereon, a push button switch 43 for calibrating the instrument, and a cup-shaped container 44 attached to housing 41. The cover 45 of cup 44 is secured to the lower end of a threaded spindle 46 with a handle 47 thereon and is adapted to be inserted into cup 44 and to be screwed downwardly and upwardly within a yoke 48 which is removably hooked to a pair of pins 49 on cup 44. Cover 45 may thus be rotated relative to cup 44 and at the same time moved downwardly into cup 44 to compress the material therein and turn it within the cup relative a grinding cone 50 with grinding teeth 51 thereon which is held in a fixed position on the bottom 52 of cup 44 (FIGS. 6 and 7). The material will then be automatically ground or cut by teeth 51 when cover 45 is being screwed downwardly. Cup 44 together with cover 45 serve as one electrode, while grinding cone 50 serves as the other electrode. These two electrodes are insulated from each other by a disk 53 (FIG. 6) of insulating material which is secured to the bottom 52 of cup 44. For connecting the two electrodes, that is, cup 44 with cover 45 and grinding cone 50, to the instrument in housing 41, the bottom 52 of cup 44 carries a two-pole plug 54, 55, the two terminals of which are insulated from each other and disposed concentrically behind each other. Plug terminal 54 is secured and conductively connected to the bottom 52 of cup 44, while the other plug terminal 55 has a shaft 56 which is screwed into a tapped bore 57 in grinding cone 50, as shown in FIGURE 7. Another bore 58 eccentrically in grinding cone 50 is adapted to receive a setpin, not shown, which is mounted in and projects upwardly from insulating disk 53 for preventing any rotary movement of grinding cone relative to cup 44. Plug terminals 54 and 55 are adapted to be inserted into a socket in housing 41 forming two contacts 59 and 60 which are likewise disposed behind each other and insulated from each other. Thus, plug terminal 54 fits into socket contact 59 and plug terminal 55 into socket contact 60.

Socket 59 has a recess 61 into which a temperature-responsive resistance element 62 is inserted so as to be in an electrically and thermally conductive connection with socket 59 and thus also with cup 44, so that the temperature of the substance to be measured which is transmitted to the wall of cup 44 will be further transmitted through plug terminal 54 and socket 59 to resistance element 62.

The connecting terminal on resistance element 62 is connected at terminal 63' to the control coil 63 of a double-coil instrument 64 so that a change in the resistance of resistance element 62 will affect the deflection of the measuring coil 65 of instrument 64 which is connected to the measuring circuit in the manner as previously described with reference to FIGURE 2. In place of the resistor 30, as shown in FIGURE 2, it is also possible to connect a resistor 66, as shown in FIGURE 6, to the anode of tube 20, while the tapped side of this resistor 66 is connected to the temperature-responsive resistor 62.

The temperature-responsive resistor 62 may also be connected into the measuring circuit in a different manner, as shown, for example, in FIGURES 8 and 9. In FIGURE 8 terminal 63' is connected directly to cathode 24 and resistor 62 thus influences the measuring current directly. In FIGURE 9, the resistor 62 is connected through resistor 38 in parallel to a part of the adjustable anode resistor 30' and likewise affects the flow of the current through the ammeter in accordance with its change in temperature. Finally in FIGURE 10, the resistor 62 is connected through resistor 38 in parallel to the instrument and affects the flow of current therethrough in the same manner. Depending upon the total adjustment of all the resistors 26, 29, 30, 31, and 38, it may be preferable to apply either one, or the other connection of the temperature-responsive resistor 62.

Although my invention has been illustrated and described with reference to the preferred embodiments, thereof, I wish to have it understood that it is in no way limited to the details of such embodiments, but is capable of numerous modifications within the scope of the appended claims.

Having thus fully disclosed my invention, what I claim is:

1. A hygrometer for measuring moisture content of any one of a plurality of materials having relatively very high ohmic values, comprising a pair of electrodes adapted to be placed in contact with the respective material at a certain distance from each other to form a measuring section, a current measuring instrument including a dial having a scale for indicating measured moisture-content values, an amplifier device, a source of direct current for energizing said amplifier device and for providing a voltage drop at said measuring section between said electrodes, first circuit means for connecting one of said electrodes to the positive terminal of said current source, means for directly connecting the second of said electrodes to said amplifier device to control an output current of the latter in accordance with the electrical resistance between said electrodes, means for directly connecting said amplifier device to the negative terminal of said current source, second circuit means for connecting the output current of said amplifier device through said instrument to the positive terminal of said current source to energize said instrument for indicating on said scale the value of electric resistance between said electrodes in accordance with the moisture content of said material and with a substantially linear indicating characteristic, each of said circuit means including at least one variable resistance means for influencing the indicating characteristic of said instrument to provide a combined effect whereby the lower and upper values on the scale of said instrument are expanded to be clearly readable and whereby the values of said resistance means are selected to provide an optimum current flowing through said instrument correlated to the material and range of resistance values to be measured between said electrodes.

2. A hygrometer as defined in claim 1, further comprising a housing containing said measuring instrument, said amplifying device and each of said resistance means, means for supporting said electrodes in fixed spaced relationship with respect to each other outside of said housing, intermediate connecting means connecting said electrodes and their respective circuits within said housing and a switch in said housing for selectively connecting said source to energize said measuring section and said amplifier device after said electrodes are placed in contact with said material to enable a moisture content indication to be read on the scale of said instrument.

3. A hygrometer as defined in claim 1, wherein said source of direct current comprises an anode battery, said amplifier device comprising an electron tube having an anode, a cathode having incandescent heating means including two terminals therefor of which one provides direct connection between said cathode and the negative terminal of said battery and a control grid, said electron tube having a characteristic with a substantially straight part in which the electric resistance corresponding to the moisture content of the respective material to be measured is transformed into a substantially linear indicating characteristic, said resistance means comprising a first resistor connected between the other of said cathode heating terminals and the positive terminal of said battery for limiting the current for heating said cathode and having a tapping member for adjusting the value of the anode voltage, said measuring instrument being connected between said anode and to said tapping member, said second electrode being directly connected to said control grid, and said one electrode being connected, together with said instrument, to said tapping member of said first resistor, a variable second resistor connected in series with said instrument for setting up a maximum current value at the upper end of said scale, a third variable resistor connected between said anode and said instrument for varying the characteristic of said tube so as to reduce the slope at the beginning and end of said characteristic and accordingly to attain a more linear indication on the scale of said instrument.

4. A hygrometer as defined in claim 1, wherein said source of direct current comprises a dry-cell anode battery, said amplifier device comprising an electron tube having an anode, a cathode having incandescent heating means including two terminals therefor of which one provides direct connection between said cathode and the negative terminal of said battery a control grid, and a screen grid intermediate said control grid and said anode, said cathode being directly connected to the negative terminal of said battery, said resistance means comprising a first resistor connected the positive terminal of said battery for limiting the current for heating said cathode and having a tapping member for adjusting the value of the anode voltage, said measuring instrument being connected between said screen grid and said tapping member, said second electrode being directly connected to said control grid for influencing the operation of said tube in accordance with the voltage drop in said measuring section, said one electrode being connected to said tapping member of said first resistor, a variable second resistor connected in series with said instrument and with said measuring section for setting up a maximum current value at the upper end of said scale, a third variable resistor connected between said anode and said screen grid for varying the characteristic of said tube so as to reduce the slope at the beginning and end of said characteristic to attain a more linear indication on the scale of said instrument.

5. A hygrometer as defined in claim 3, wherein said first circuit means comprise a fourth variable resistor in series with said measuring section for increasing said voltage drop in said measuring section when the resistance value of said section is low.

6. A hygrometer as defined in claim 5, further comprising a fifth variable resistor adapted to be connected between said electrodes, and a switch for connecting said fifth resistor instead of said measuring section for calibrating said instrument to a standard value.

7. A hygrometer as defined in claim 2, further comprising means including a temperature-responsive resistor thermally connected to one of said electrodes to be heated to substantially the temperature of said material and electrically connected between said last-mentioned electrode and a point of one of said circuit means to effect temperature compensation of the current to be measured by said instrument.

8. A hygrometer as defined in claim 3, further comprising means including a temperature-responsive resistor thermally connected to one of said electrodes to be heated to substantially the temperature of said material and electrically connected between said last-mentioned electrode and the cathode of said tube.

9. A hygrometer as defined in claim 3, further comprising means including a temperature-responsive resistor thermally connected to one of said electrodes to be heated to substantially the temperature of said material and electrically connected between said last-mentioned electrode and the positive terminal of said instrument.

10. A hygrometer as defined in claim 3, wherein said third resistor has an adjustable tapping member, and further comprising means including a temperature-responsive resistor thermally connected to one of said electrodes to be heated to substantially the temperature of said material and electrically connected between said last mentioned electrode and said tapping member of said third resistor.

11. A hygrometer as defined in claim 3, wherein said measuring instrument comprises a control coil and a measuring coil, and further comprising means including a temperature-responsive resistor thermally connected to one of said electrodes to be heated to substantially the temperature of said material and electrically connected between said last-mentioned electrode and said control coil.

12. A hygrometer as defined in claim 4 wherein said second circuit means further comprise a potentiometer having an adjustable tapping member, a pair of limiting resistors each connected to one end of said potentiometer, said limiting resistors being connected at one end to said first resistor on the positive terminal of said battery, and at the other end to the adjustable tapping member of said first resistor, said tapping member of said potentiometer being directly connected to the tapping member of said second resistor for setting up a constant anode voltage so that said anode voltage will remain substantially constant when any one of said four variable resistors is being adjusted.

13. A hygrometer as defined in claim 2, wherein said electrodes comprise a cup-shaped member adapted to receive the material to be material to be measured and having walls forming one of said electrodes, and a conical member forming the second electrode on the bottom of said cup-shaped member and electrically insulated therefrom, said conical member having cutting teeth, and means for compressing said material upon said cutting teeth of said conical member.

14. A hygrometer as defined in claim 13, wherein said compressing means include means include for rotating said conical member and said material relative to each other so as to grind said material on said cutting teeth of said conical member.

15. A hygrometer as defined in claim 13, further comprising a plug having a connecting terminal secured to said cup-shaped member and a connecting terminal secured to said conical member, said two terminals being insulated from each other and disposed concentrically behind each other, and a socket means mounted within said housing and including two terminals insulated from each other and disposed concentrically behind each other and each adapted to receive one of said connecting terminals for attaching said cup-shaped member directly to said housing and connecting said two electrodes to said amplifier device and said first circuit means.

16. A hygrometer as defined in claim 2, wherein said electrodes comprise a cup-shaped member adapted to receive the material to be measured and having walls forming one of said electrodes, and a conical member forming the second electrode on the bottom of said cup-shaped member and electrically insulated therefrom, said cup-shaped member having an aperture, and a temperature-responsive resistor in said aperture and in contact with the wall thereof so as to be thermally connected to said cup-shaped member to be heated to substantially the temperature of said material and electrically connected between said cup-shaped member and a point of one of said circuit means to effect temperature compensation of the current to be measured by said instrument.

17. A hygrometer for measuring moisture content of any one of a plurality of materials having relatively very high ohmic values, comprising a pair of electrodes adapted to be placed in contact with the respective material, current indicating means for measuring the output current of an amplifier means and provided with a dial having a scale for indicating measured moisture-content values, amplifier means having a plurality of electrodes including a cathode, an anode and a control grid, a single source of direct current having two terminals for energizing said amplifier means, said amplifier means normally offering non-linear operating characteristics for output currents corresponding to the upper and lower ends of said scale, and means operatively connecting said single source of direct current and said pair of electrodes to said amplifier means to provide an indication of the moisture-content in said current indicating means, said connecting means including a first circuit means directly connecting one of said pair of electrodes to said control grid, second circuit means for effectively connecting the anode of said amplifier means through said current indicating means to one terminal of said single source, third circuit means effectively connecting the other terminal of said single source of direct current with said cathode, and fourth circuit means operatively connecting the other of said pair of electrodes to said second circuit means, at least two of said first, second and fourth circuit means including resistance means of predetermined value for effectively changing the operational characteristics of said amplifying means to thereby effectively expand the upper and lower ends of said scale while at the same time improving the linearity thereof.

18. A hygrometer for measuring moisture-content of any one of a plurality of materials having relatively very high ohmic values, comprising a pair of electrodes adapted to be placed in contact with the respective material, current indicating means provided with a dial having a scale for indicating measured moisture-content values, amplifier means having a plurality of elements including an input element, an output element and a control element, a single source of direct current for energizing said amplifier means, said amplifier means normally offering non-linear operating characteristics for current values thereof corresponding to the upper and lower ends of said scale, and means operatively connecting said single source of direct current and said pair of electrodes to said amplifier means to provide an indication of the moisture content in said current indicating means, said connecting means including first circuit means directly connecting one of said pairs of electrodes to said control element, second circuit means for connecting the output element of said amplifier means through said current indicating means to said single source, third circuit means operatively connecting said single source of direct current with the input element of said amplifier means and for heating the latter, and fourth circuit means operatively connecting the other pair of said electrodes to said second circuit means, at least two of said first, second and fourth circuit means including resistance means of predetermined value for varying the operational characteristics of said amplifying means to thereby effectively expand said upper and lower ends while at the same time improving the linearity thereof.

19. A hygrometer for measuring moisture content of any one of a plurality of materials having relatively very high ohmic values, comprising a pair of electrodes adapted to be placed in contact with the respective material at a distance from each other to form a measuring section, current indicating means provided with a dial having a scale for indicating measured moisture content values, amplifier means having a plurality of electrode elements including an input electrode, an output electrode and a control electrode, a single source of direct current for energizing said amplifier means, said amplifier means normally offering non-linear operating characteristics for current values thereof corresponding to the upper and lower ends of said scale, and means operatively connecting said single source of direct current and said pair of electrodes to said amplifier means to provide an indication of the moisture content in said current indicating means, said connecting means including first circuit means directly connecting one of said pairs of electrodes to said control electrode, second circuit means for connecting the output electrode of said amplifier means through said current indicating means to said single source, third circuit means operatively connecting said single source of direct current with the input electrode of said amplifier means, and fourth circuit means operatively connecting the other pair of said electrodes to said second circuit means, at least two of said first, second and fourth circuit means including resistance means of predetermined value for varying the operational characteristics to thereby effectively expand said upper and lower ends of said amplifying means while at the same time improving the linearity of the scale.

20. A hygrometer for measuring moisture content of any one of a plurality of materials having relatively very high ohmic values, comprising a pair of electrodes adapted to be placed in contact with the respective material, current indicating means for measuring the output current of an amplifier means and provided with a dial having a scale for indicating measured moisture-content values, amplifier means having a plurality of elements including an input element, an output element and a control element, a single source of direct current having two terminals for energizing said amplifier means, said amplifier means normally offering non-linear operating characteristics for output currents corresponding to the upper and lower ends of said scale, and means operatively connecting said single source of direct current and said pair of electrodes to said amplifier means to provide an indication of the moisture-content in said current indicating means, said connecting means including a first circuit means directly and exclusively connecting said control element to one of said pairs of electrodes, second circuit means for connecting the output element of said amplifier means through said current indicating means to said single source, third circuit means operatively connecting said single source of direct current with said input element and fourth circuit means operatively connecting the other of said pair of electrodes to said second circuit means, said second, third and fourth circuit means each including resistance means of predetermined value for changing the operational characteristics of said amplifying means to thereby effectively and selectively contract or expand the upper and lower ends of said scale and improve the linearity of the extended operating range of said amplifying means.

21. A hygrometer for measuring moisture content of any one of a plurality of materials having relatively very high ohmic values, comprising a pair of electrodes adapted to be placed in contact with the respective material, current indicating means for measuring the output current of an amplifier means and provided with a dial having a scale for indicating measured moisture-content values, amplifier means having a plurality of electrodes including a cathode, an anode, a screen grid and a control grid, a single source of direct current having two terminals and first potentiometer means connected thereacross for energizing said amplifier means, said amplifier means normally offering non-linear operating characteristics for output currents corresponding to the upper and lower ends of said scale, and means operatively connecting said single source of direct current and said pair of electrodes to said amplifier means to provide an indication of the moisture-content in said current indicating means, said connecting means including a first circuit means normally connecting said control grid exclusively to one of said pairs of electrodes, second circuit means including first resistance means, said indicating means and second potentiometer means for connecting the anode and screen grid of said amplifier means to one terminal of said single source through said first potentiometer means, third circuit means operatively connecting the other terminal of said single source of direct current with said cathode, and fourth circuit means including second resistance means operatively connecting the other of said pair of electrodes to said second circuit means, said first and second potentiometer and resistance means being of predetermined value for effectively changing the operational characteristics of said amplifying means to thereby effectively expand the upper and lower ends of said scale while at the same time improving the linearity thereof.

References Cited in the file of this patent

UNITED STATES PATENTS

| | | |
|---|---|---|
| 1,601,383 | Todd | Sept. 28, 1926 |
| 1,890,545 | Limbrick | Dec. 13, 1932 |
| 2,183,333 | Hart | Dec. 12, 1939 |
| 2,505,936 | Behn | May 2, 1950 |
| 2,624,782 | Lowson | Jan. 6, 1953 |
| 2,734,166 | Hooker | Feb. 7, 1956 |

FOREIGN PATENTS

| | | |
|---|---|---|
| 436,923 | Great Britain | Oct. 21, 1935 |
| 516,378 | Great Britain | Jan. 1, 1940 |
| 637,738 | Great Britain | May 24, 1950 |